(12) United States Patent  
Joffe

(10) Patent No.: US 9,116,076 B2  
(45) Date of Patent: Aug. 25, 2015

(54) SYSTEMS AND METHODS FOR CANCELING ELECTRICAL CROSSTALK FROM MEASUREMENTS OF OPTICAL SIGNALS

(75) Inventor: Daniel M. Joffe, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 499 days.

(21) Appl. No.: 13/367,227

(22) Filed: Feb. 6, 2012

(65) Prior Publication Data

US 2013/0201472 A1    Aug. 8, 2013

(51) Int. Cl.
*G01N 21/00* (2006.01)
*G01M 11/00* (2006.01)

(52) U.S. Cl.
CPC ...... *G01M 11/3118* (2013.01); *G01M 11/3145* (2013.01)

(58) Field of Classification Search
CPC .......... G01N 21/00; H04B 1/00; H04B 10/08; G01C 19/64
USPC .............................. 356/73.1; 398/21; 455/296
See application file for complete search history.

(56) References Cited

U.S. PATENT DOCUMENTS

| | | | |
|---|---|---|---|
| 5,020,872 A | 6/1991 | DuPuy et al. | |
| 5,491,548 A * | 2/1996 | Bell et al. | 356/73.1 |
| 2006/0045527 A1 | 3/2006 | Maeda et al. | |
| 2008/0096512 A1* | 4/2008 | Mezer et al. | 455/296 |
| 2009/0257743 A1* | 10/2009 | Chung et al. | 398/21 |
| 2011/0001959 A1 | 1/2011 | Hasegawa | |
| 2011/0008060 A1 | 1/2011 | Kucharski | |
| 2011/0217045 A1 | 9/2011 | Watson et al. | |

* cited by examiner

*Primary Examiner* — Tarifur Chowdhury
*Assistant Examiner* — Jamil Ahmed
(74) *Attorney, Agent, or Firm* — Maynard Cooper & Gale, P.C.; Jon E. Holland

(57) ABSTRACT

An exemplary optical transmission system comprises an optical subassembly (OSA) coupled to an optical receiver via an optical fiber. The OSA comprises a laser diode configured to transmit optical signals across the optical fiber, and the OSA further comprises an avalanche photodiode (APD) configured to receive optical return signals from the optical fiber. The system further comprises a crosstalk canceller configured to estimate an amount of electrical crosstalk affecting measurements of the return signals in order to cancel such crosstalk from measurements of subsequent optical signals received by the APD.

18 Claims, 6 Drawing Sheets

SYSTEMS AND METHODS FOR CANCELING ELECTRICAL CROSSTALK FROM MEASUREMENTS OF OPTICAL SIGNALS

RELATED ART

Optical time domain reflectometers (OTDRs) for detecting fiber anomalies have been developed and successfully used. One type of OTDR transmits an M-sequence along an optical fiber. A portion of the light from the M-sequence is returned toward the transmitter from points along the optical fiber. Such returns are produced by scattering of the light (Rayleigh backscatter) all along the length of the fiber and in some cases by localized reflections (Fresnel reflections) at particular points along the fiber. At an anomaly, such as a degraded splice, more attenuation may occur as light passes through the splice, and in some cases more light may be reflected at this point than at other points that are free of anomalies. The OTDR measures the light returned from points along the length of the fiber and creates a display of the intensity of light reflected from each point of the fiber. This display allows users to detect anomalies.

The measured OTDR returns are quite small and, thus, susceptible to being obscured by relatively small amounts of noise, including electrical crosstalk. In this regard, the optical emitter (e.g., laser diode) and the optical receiver (e.g., avalanche photodiode (APD)) within an optical subassembly (OSA) are coupled to electrical wiring that are in sufficiently close proximity such that electromagnetic energy couples between the wiring causing an additive signal (electrical crosstalk) that obscures the electrical signals output from the optical receiver. The electrical crosstalk in an OSA is relatively small compared to the normal data signals received by the OSA, but such distortion has a more significant effect on OTDR measurements, which are based on optical returns that are much smaller than typical data signals.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for canceling electrical crosstalk from measurements of optical signals. An exemplary embodiment of an optical transmission system comprises an optical subassembly (OSA) coupled to an optical receiver via an optical fiber. The OSA comprises an optical emitter (e.g., a laser diode) configured to transmit optical signals across the optical fiber, and the OSA further comprises an optical detector (e.g., an avalanche photodiode) configured to receive optical return signals from the optical fiber. The system further comprises a crosstalk canceller configured to estimate an amount of electrical crosstalk affecting measurements of the return signals in order to cancel such crosstalk from measurements of subsequent optical signals received by the optical detector.

Figure 1:
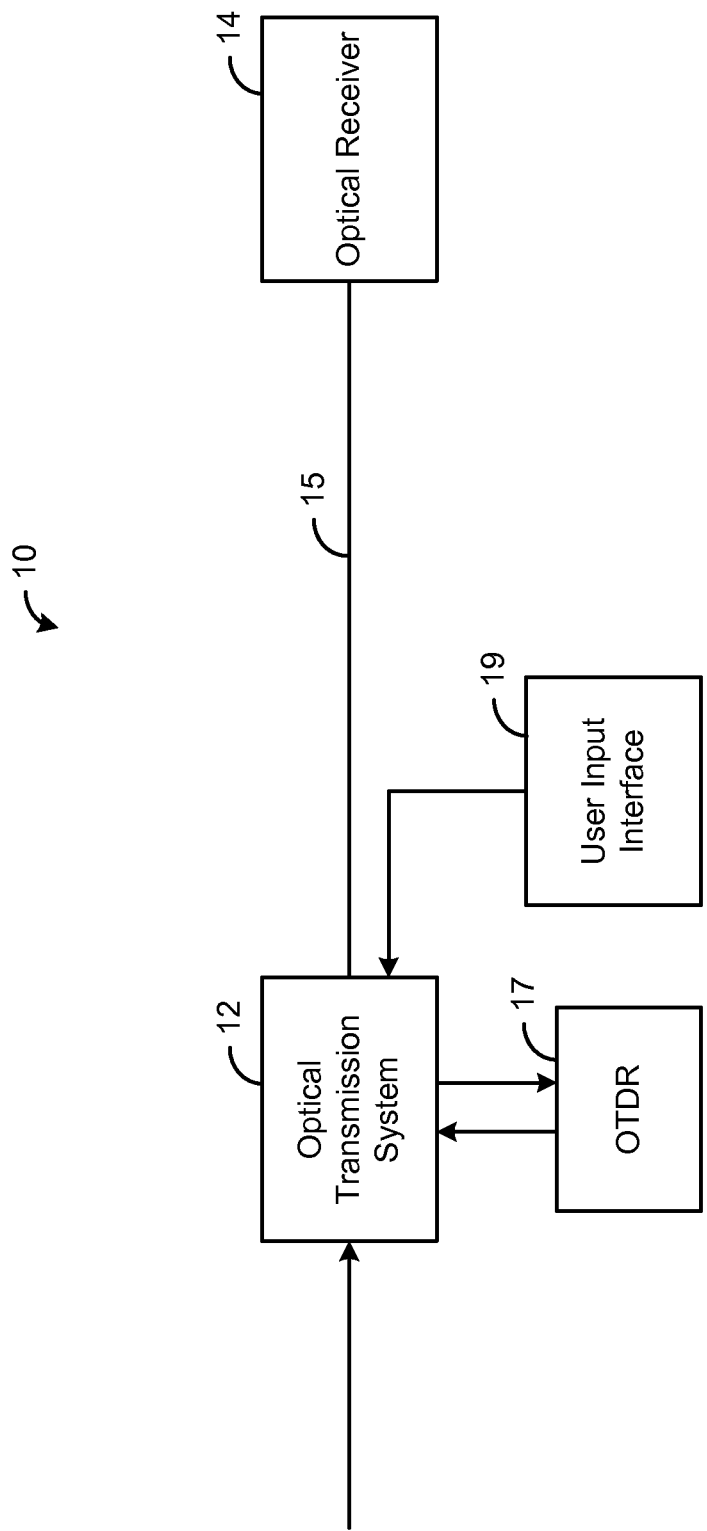
FIG. 1 is a block diagram illustrating an exemplary embodiment of a fiber-optic communication system in accordance with the present disclosure.

FIG. 1 depicts an exemplary embodiment of a fiber-optic communication system 10. The communication system 10 comprises an optical transmission system 12 coupled to an optical receiver 14 via an optical fiber 15. The optical transmission system 12 is configured to transmit optical signals to the optical receiver 14 via the fiber 15 and to receive optical signals (e.g., optical returns) from the fiber 15. The optical transmission system 12 is further configured to provide digital measurements of the received signals, as will be discussed in more detail hereafter. The system 10 also comprises an optical time domain reflectometer (OTDR) 17 coupled to the optical transmission system 12. The OTDR 17 is configured to receive measurements of optical returns from the optical transmission system 12 and to facilitate detection of anomalies, such as, for example, degraded splices, along the optical fiber 15 based on the returns.

In this regard, light generally reflects from points along the fiber 15 as the light propagates, but more light is typically reflected at a line anomaly, such as a degraded splice. In one exemplary embodiment, the OTDR 17 transmits a pseudorandom (PN) sequence, such as an M-sequence, through the fiber 15 and correlates the optical returns with the transmitted sequence in order to identify points along the fiber 15 that return more than nominal amounts of light. The OTDR 17 then provides an output indicative of such points, which are likely sources of anomalies. Exemplary embodiments of OTDRs are described in commonly-assigned U.S. patent application Ser. No. 12/783,999, entitled "Systems and Methods for Unobtrusively Testing Optical Fibers" and filed on May 20, 2010, which is incorporated herein by reference.

Note that the optical returns are relatively small in comparison to the optical data signals transmitted or received by the optical transmission system 12. Thus, electrical crosstalk generally has a more significant effect on measurements of the return signals thereby negatively affecting the performance of the OTDR 17. In one exemplary embodiment, the transmission system 12 estimates the amount electrical crosstalk affecting the measurements of return signals received from the fiber 15 and uses such estimate to cancel electrical crosstalk from the measurements of subsequent optical signals (e.g., return signals) received from the fiber 15, as will be discussed in more detail hereafter. Note that the estimate may be used to cancel crosstalk from the measurement of any type of optical signal from the fiber 15, including optical data signals that are received by the optical transmission system 12 from the fiber 15.

As shown by FIG. 1, the communication system 10 further comprises a user input interface 19 that is coupled to the optical transmission system 12. The user input interface 19 allows a user to submit inputs for managing the optical transmission system 12, as will be discussed in more detail hereafter. As an example, the user input interface 19 may comprise a keypad that allows a user to manually provide inputs. In another embodiment, the user input interface 19 comprises a data port, such as an RS-232 port, that allows a user to connect an external communication device (not shown) and submit inputs through such external communication device. Other types of user input interfaces 19 are possible in other embodiments.

Figure 2:
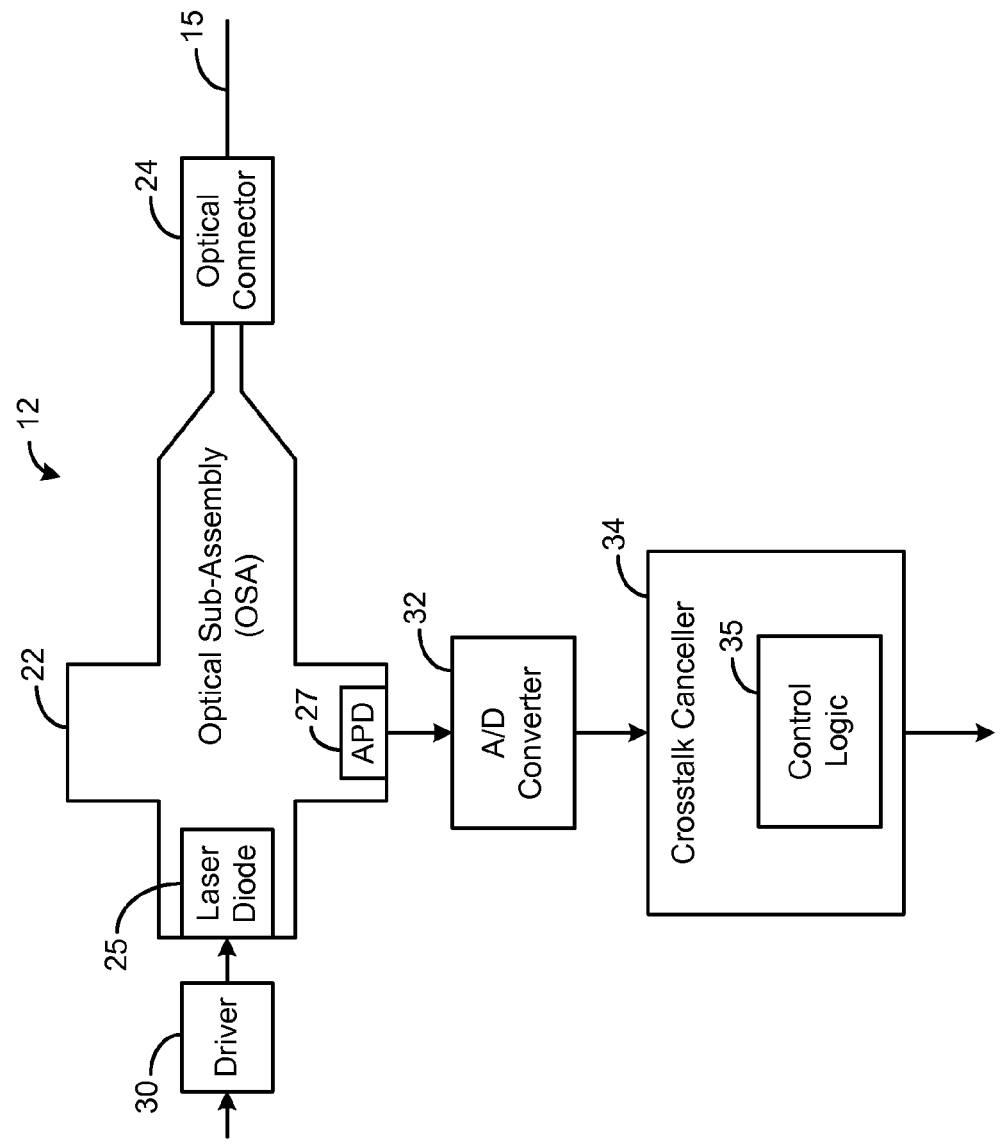
FIG. 2 is a block diagram illustrating an exemplary embodiment of an optical transmission system, such as is depicted by FIG. 1.

FIG. 2 depicts an exemplary embodiment of an optical transmission system 12, such as is depicted by FIG. 1. The exemplary optical transmission system 12 of FIG. 2 comprises an optical subassembly (OSA) 22 coupled to an optical fiber 15 through an optical connector 24 from which the fiber 15 can be disconnected. In one embodiment, the OSA 22 comprises a laser diode 25 and an avalanche photodiode (APD) 27. However, other types of optical emitters and optical detectors are possible in other embodiments.

The laser diode 25 is coupled to a driver 30 that receives an electrical signal and drives the laser diode based on such data signal with the appropriate voltage and current for the type of laser diode 25 used. The laser diode 25 is configured to convert the electrical signal received from the driver 30 into an optical signal for transmission through the fiber 15. Light from such optical signal is reflected at points along the fiber 15 as the signal propagates, thereby creating optical returns that are received by the APD 27. The APD 27 is configured to receive such optical returns from the optical fiber 15 and to convert the optical returns into electrical signals.

The optical transmission system 12 further comprises an analog-to-digital (A/D) converter 32 coupled to the APD 27. The A/D converter 32 converts an analog electrical signal from the APD 27 into a digital signal. Each digital sample output by the A/D represents a measurement of light detected by the APD 27.

Note that the electrical driver circuitry (e.g., laser diode 25, driver 30 and associated wiring) for driving the laser diode 25 is in close proximity to the electrical receive circuitry (e.g., APD 27, A/D converter 32, and associated wiring) for receiving and measuring optical signals such that electromagnetic energy couples from the driver circuitry to the receive circuitry. Such energy interferes with the optical signal measurements provided by the A/D converter 32 and is generally referred to as "electrical crosstalk." As set forth above, such electrical crosstalk is particularly problematic for optical returns used by the OTDR for detecting line anomalies due to the relatively small amplitude of such returns.

As shown by FIG. 2, the system 12 further comprises a crosstalk canceller 34 coupled to the A/D converter 32. The crosstalk canceller 34 is configured to receive from the A/D converter 32 digital measurements of optical signals received by the APD 27, and the crosstalk canceller 34 is further configured to determine an amount of electrical crosstalk affecting such measurements. Such crosstalk is substantially constant provided that the average transmission power of the laser diode is substantially constant. In this regard, the spacing between the components of the driver circuitry and the receive circuitry does not change. Thus, if the amount of electromagnetic energy generated by the driver circuitry remains substantially constant, then the electrical crosstalk should not fluctuate significantly. In one exemplary embodiment, the crosstalk canceller 34 leverages this fact in order to estimate an amount of crosstalk interference induced by the driver circuitry and to combine the estimate with future measurements from the A/D converter 32 in order to cancel the effects of crosstalk interference from such measurements, as will be described in more detail hereafter. Thus, the measurements output by the crosstalk canceller 34 are substantially free of electrical crosstalk induced by the driver circuitry.

Referring to FIG. 2, the optical fiber 15 can be disconnected from the optical connector 24. In one exemplary embodiment, the crosstalk canceller 34 estimates electrical crosstalk during a calibration process in which the optical fiber 15 is manually disconnected from the optical connector 24 by a technician or other user. Once the fiber 15 has been disconnected, the technician provides an input via the user input interface 19 (FIG. 1), and the crosstalk canceller 34 is responsive to such input for initiating the calibration.

During the calibration process, the driver 30 drives the laser diode 25 with an electrical signal so that the laser diode 25 generates an optical signal and the driver circuitry generates electromagnetic energy like it would during normal operation when the laser diode 25 is transmitting an optical signal through the fiber 15. However, since the fiber 15 is disconnected from the optical connector 24, the optical signals transmitted by the laser diode 25 escape into free space rather than propagating through the optical fiber 25. Thus, the APD 27 does not receive any returns from the fiber 25. In such case, the analog electrical signal provided by the APD 27 is attributable primarily to electrical crosstalk, which as described above generally remains constant provided that the driver 30 is driving the laser diode 25. Thus, during calibration, each measurement provided by the A/D converter 32 represents a measurement of electrical crosstalk.

The crosstalk canceller 34 is configured to use at least one measurement provided by the A/D converter 32 during calibration in order to determine a value, referred to herein as the "crosstalk cancellation value," that represents an estimate of the electrical crosstalk induced by the driver circuitry. If desired, the crosstalk canceller 34 may take any measurement provided by the A/D converter 32 while the driver 30 is driving the laser diode 25 during the calibration process and use such measurement as the crosstalk cancellation value. However, in one exemplary embodiment, the crosstalk canceller 34 is configured to mathematically combine (e.g., average) multiple measurements from the A/D converter 32 and to use the result as the crosstalk cancellation value. The crosstalk canceller 34 is further configured to store the crosstalk cancellation value and thereafter to mathematically combine (e.g., subtract) the crosstalk cancellation value with measurements from the A/D converter 32 after the calibration process in order to cancel electrical crosstalk from such measurements. Once the calibration process has been completed, the fiber 15 is re-connected to the fiber 15 by the technician or other user so that data may be communicated through the fiber 15 by the system 12.

Figure 3:
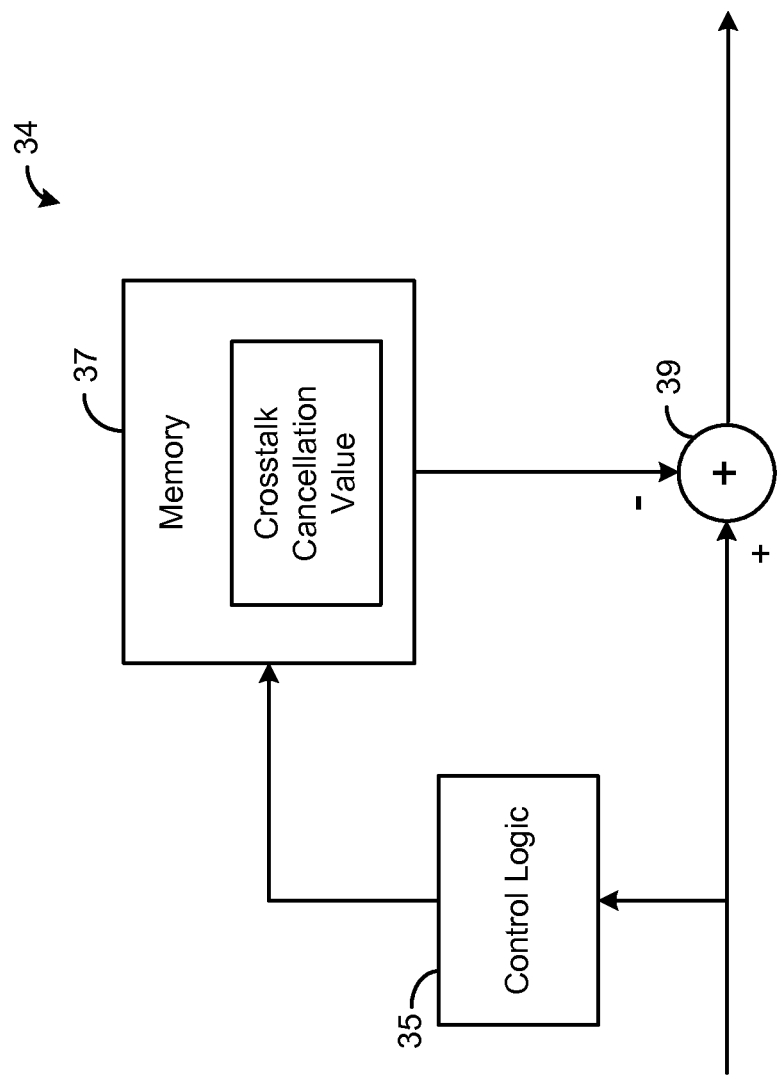
FIG. 3 is a block diagram illustrating an exemplary embodiment of a crosstalk canceller, such as is depicted by FIG. 2.

FIG. 3 depicts an exemplary embodiment of the crosstalk canceller 34 of FIG. 2. As shown by FIG. 3, the crosstalk canceller 34 has control logic 35 for generally controlling the operation of the crosstalk canceller 34. In one exemplary embodiment, the control logic 35 is implemented in hardware, such as a field programmable gate array (FPGA). However, in other embodiments, the control logic 35 can be implemented in software, hardware, firmware or any combination thereof.

The control logic 35 receives at least one measurement from the A/D converter 32 during a calibration process, as described above, and determines the crosstalk cancellation value from such measurement or measurements. Once the crosstalk cancellation value is determined, it is stored in memory 37, such as a register or other type of memory.

As shown by FIG. 3, the crosstalk canceller 34 further comprises a summer 39. After the calibration process, the summer 39 is configured to receive the digital measurements from the A/D converter 32 and to subtract the crosstalk cancellation value from each measurement in order to provide measurements, referred to hereafter as "compensated measurements," that are substantially free of the effects of electrical crosstalk induced by the driver circuitry. Such compensated measurements are output from the crosstalk canceller 34 and are received by the OTDR 17 and/or other circuitry for further processing.

Figure 4:
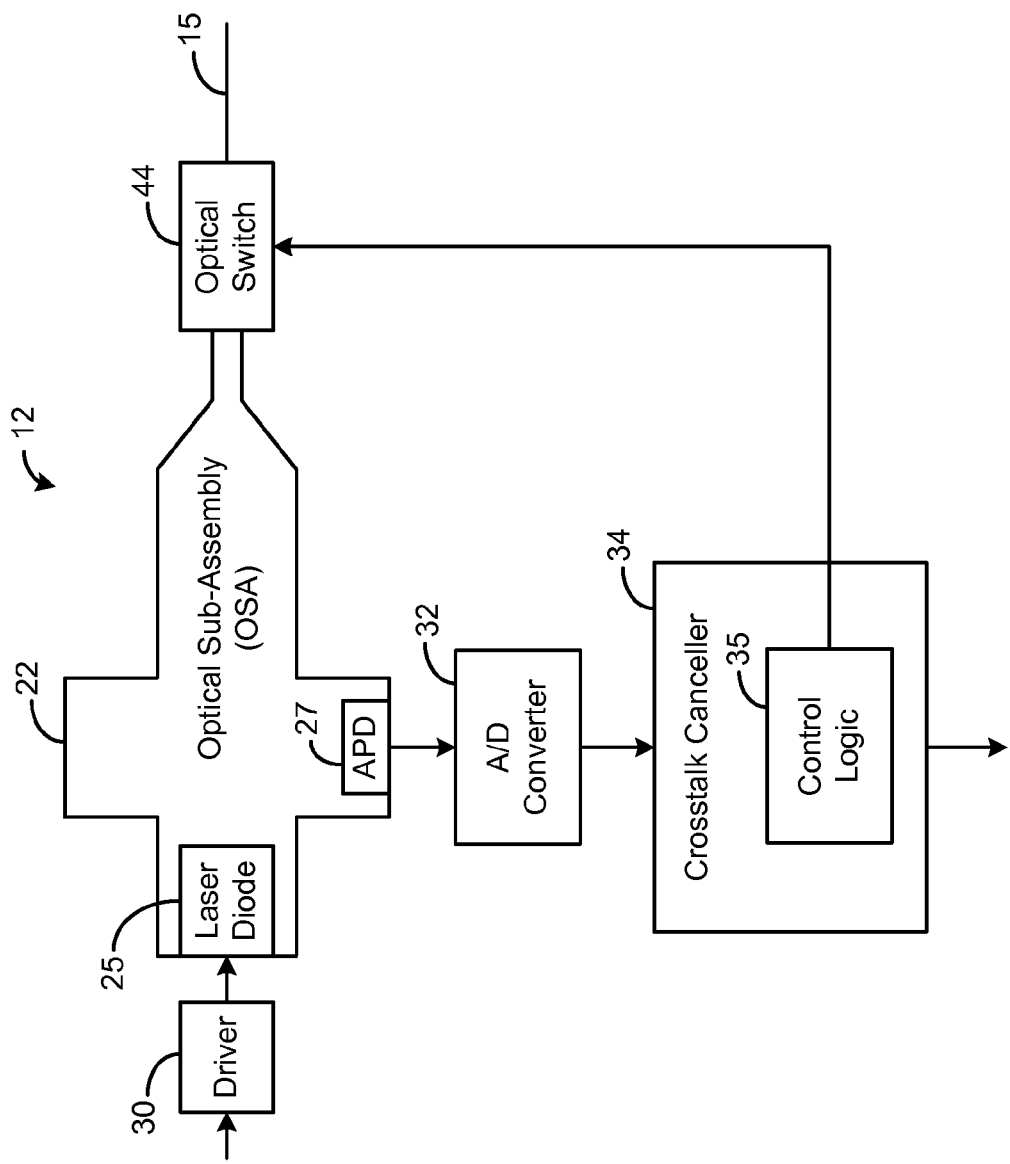
FIG. 4 is a block diagram illustrating another exemplary embodiment of an optical transmission system.

FIG. 4 depicts another exemplary embodiment of an optical transmission system 12. Except as is otherwise described herein, the configuration of the system 12 depicted by FIG. 4 is the same as that in FIG. 2. As shown by FIG. 4, the system 12 further comprises an optical switch 44 coupled between the OSA 22 and the optical fiber 15. When the switch 24 is in a closed position, it allows optical signals to pass between the OSA 22 and the fiber 15. Thus, optical signals transmitted by the laser diode 25 pass through the switch 44 to the fiber 15, and optical signals from the fiber 15 pass through the switch 44 to the APD 27. That is, the switch 44 optically connects the OSA 22 to the fiber 15. However, when the switch 24 is in an open position, the switch 44 optically disconnects the OSA 22 from the fiber 15. In this regard, optical signals transmitted by the laser diode 25 are allowed to escape from the switch 44 into free space, and optical signals received from the fiber 15 are similarly allowed to escape from the switch 44. Thus, when the switch 44 is in the open position, the system 12 behaves similar to the embodiment described above when the fiber 15 is manually disconnected from the optical connector 24 (FIG. 2). However, as will be described in more detail below, the crosstalk canceller 34 is configured to control the state of the switch 44 so that the calibration process can be run automatically without requiring a technician or other user to manually disconnect the fiber 15 from the optical connector 24.

In this regard, the control logic 35 is coupled to the optical switch 24 and is configured to transmit control signals for selectively controlling the operational state of the switch 44. In particular, at initiation of the calibration process, the control logic 35 opens the switch 44 and then estimates the crosstalk cancellation value using the same techniques described above with respect to the embodiment shown by FIG. 2. Because the switch 44 is in an open position during the calibration process, the optical signals transmitted by the laser diode 25 escape the system 12 and are not received by the APD 27, as described above for the embodiment depicted by FIG. 2.

Once the crosstalk cancellation value is determined and stored in the memory 37, the control logic 35 closes the optical switch 44 thereby optically connecting the OSA 22 to the fiber 15. Thereafter, the crosstalk canceller 34 combines the crosstalk cancellation value with measurements of optical signals received by the APD 27 in order to cancel the effects of electrical crosstalk from these measurements, as described above for the embodiment depicted by FIG. 2.

Note that the calibration described above for the embodiment of FIG. 4 may be initiated via user input or may be automatically initiated by the control logic 35. As an example, the control logic 35 may be configured to perform the calibration periodically in order to update the crosstalk cancellation value over time. Moreover, the embodiment depicted by FIG. 4 has the advantage of not requiring the presence of a technician or other user at the OSA 12 in order for the calibration process to be performed.

Figure 5:
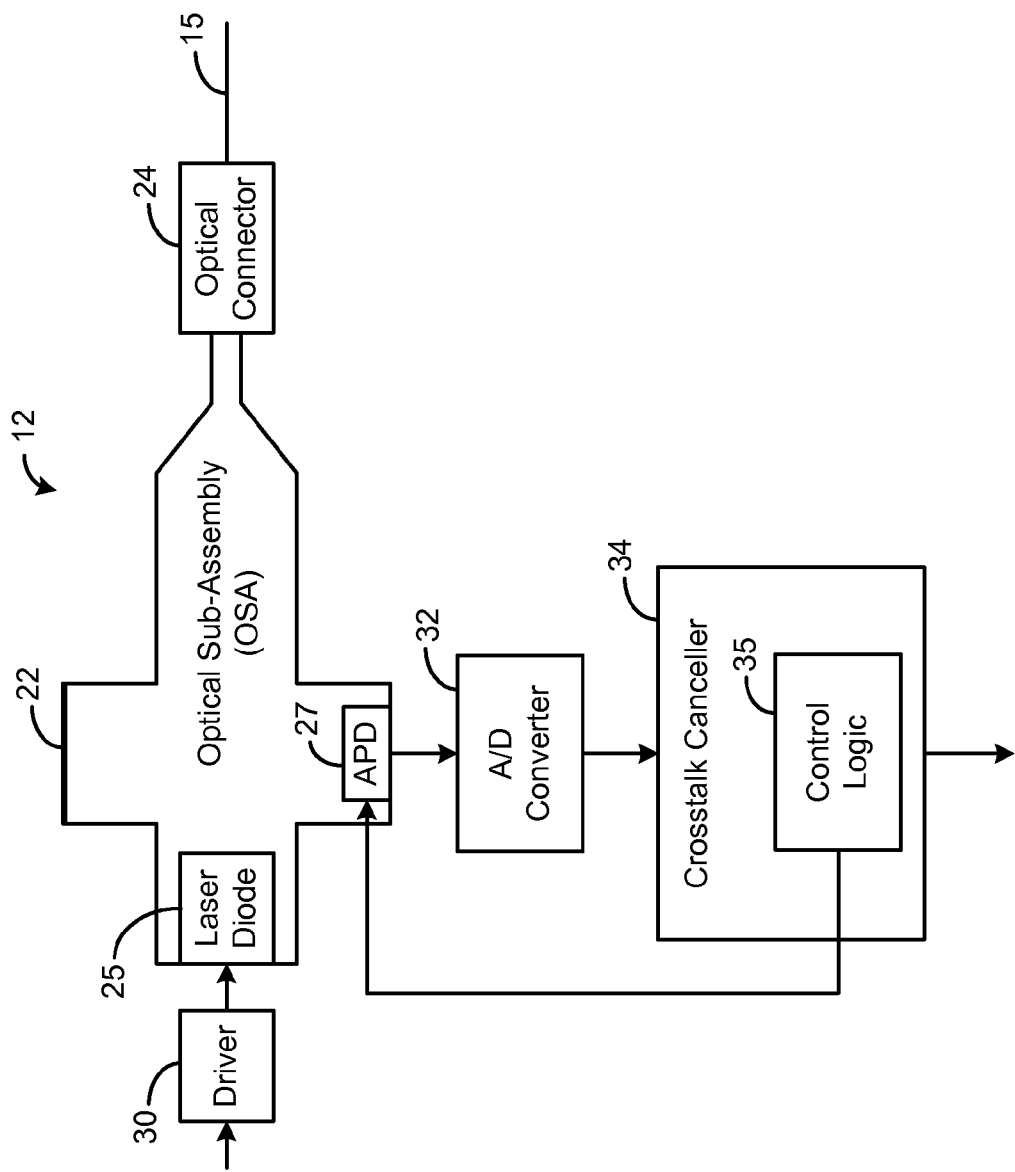
FIG. 5 is a block diagram illustrating another exemplary embodiment of an optical transmission system.

FIG. 5 depicts another exemplary embodiment of an optical transmission system 12. Except as is otherwise described herein, the configuration of the system 12 depicted by FIG. 4 is the same as that in FIG. 2. In the embodiment shown by FIG. 5, the control logic 35 is coupled to the APD 27 and provides a bias voltage for controlling the sensitivity of the APD 27. In this regard, the bias voltage provided by the control logic 35 controls the gain of the APD 27. As an example, a higher bias voltage results in a higher gain so that the light proportional electrical signal output from the APD 27 has a higher peak voltage. In normal operation, it is generally desirable to set the bias voltage and, hence, gain of the APD 27 as high as possible without causing saturation of the A/D converter 32. However, in one exemplary embodiment, the control logic 35 is configured to adjust the gain of the APD 27 during the calibration process in order to receive at least two measurements, each associated with a different APD gain. Using such measurements, the control logic 35 then calculates the crosstalk cancellation value.

In one exemplary embodiment, the control logic 35 uses two measurements of the signal produced by the APD 27 at different APD gains to form two equations that each include a value for the crosstalk contribution affecting the respective APD measurement, as will be described in more detail below. Since the electrical crosstalk is not changed by the APD bias voltage, the equations can be mathematically combined (e.g., subtracted) to eliminate the electrical crosstalk, as will be described in more detail hereafter. Note that the electrical crosstalk value can be considered to be a constant because the electrical crosstalk affecting each measurement should not be affected by a change in the APD gain assuming that the driver 30 is driving the laser diode 25 for both measurements. In this regard, as described above, the electrical crosstalk depends on the proximity of driver circuitry relative to the receive circuitry as well as the amount of electromagnetic energy induced by the driver circuitry. Such factors are not impacted by the gain of the APD 27.

Thus, in order to calculate the crosstalk cancellation value in one exemplary embodiment, the control logic 35 is configured to record at least two measurements from the A/D converter 32 at different APD gains. In particular, the control logic 35 applies a first bias voltage to the APD 27 so that the APD 27 applies a first gain to the electrical signals that it outputs to the A/D converter 32. After waiting a sufficient time to allow the APD 27 to settle, the control logic 35 stores in memory 37 (FIG. 3) a measurement, referred to hereafter as "impulse repsonse$_1$," or "$IR_1$." $IR_1$ represents a measurement of an optical signal received from the fiber 15 while the control logic 35 is biasing the APD 27 with a first voltage.

After storing $IR_1$, the control logic 35 applies a second bias voltage to the APD 27 so that the APD 27 applies a second gain to the electrical signals that it outputs to the A/D converter 32. After waiting a sufficient time to allow the APD 27 to settle, the control logic 35 stores in memory 37 (FIG. 3) a measurement, referred to hereafter as "$IR_2$." $IR_2$ represents a measurement of an optical signal received by the APD 27 from the fiber 15 while the control logic 35 is biasing the APD 27 with a second voltage that is different from the first bias voltage used to determine $IR_1$. For both measurements, the driver 30 is constantly driving the laser diode 25 so that approximately the same amount of electrical crosstalk is being generated.

Equations describing the two measurements are set forth below:

$$IR_1 = EXT + M_1 * P$$

$$IR_2 = EXT + M_2 * P$$

where $IR_1$ is the measured impulse response for a photonic return signal (P) while the gain of the APD 27 is $M_1$, where $IR_2$ is the measured impulse response for a photonic return signal (P) while the gain of the APD 27 is $M_2$, and where EXT is the electrical crosstalk value being calculated. "Photonic return signal" and "optical return signal" shall be used interchangeably herein.

In one exemplary embodiment, the control logic 35 of the crosstalk canceler 32 simply subtracts the two measurements in order to cancel crosstalk. That is, the result of subtracting $IR_1$ and $IR_2$ represents a measurement of the APD 27 with some applied gain that is based on $M_1$ and $M_2$. However, crosstalk is canceled by the subtraction operation such that the resulting measurement is free of the effects of crosstalk. In this regard, the result of subtracting of the two measurements is characterized by the following equation:

$$P=(IR_1-IR_2)/(M_1-M_2)$$

noting that the P is unaffected by the value of EXT, which has been cancelled by the subtraction operation. The control logic 35 is configured to transmit the digital value P to the OTDR 17, which uses the transmitted value as a sample of the APD 27 for detecting anomalies along the fiber 15 according to known techniques.

In another exemplary embodiment, the equations for $IR_1$ and $IR_2$ set forth above are used in a different manner in order to cancel electrical crosstalk. In particular, $IR_1$ and $IR_2$ are measured where the bias voltage of the APD 27 is controlled such that it applies a different gain for the measurement of $IR_1$ relative to the measurement of $IR_2$, as is described above. However, rather than subtracting the two measurements and using the result as a crosstalk-cancelled measurement of the APD 27, the control logic 35 instead uses the two measurements to calculate EXT according to the equations set forth above so that EXT can be stored and later used to cancel crosstalk from future measurements.

In this regard, $IR_1$ and $IR_2$ are measured thus known. Further, $M_1$, and $M_2$ are also known based on the bias voltages applied by the control logic 35. They may also be determined by gain measurements performed upon the system. In one exemplary embodiment, M1 and M2 are calculated by summing all of the taps in the impulse response. In this regard, if all of the taps in the impulse response are summed, whether $IR_1$ or $IR_2$, then the DC gain of the system, which excludes EXT. Therefore, the following equations are true:

$$Sum\_of\_taps(IR_1)=M_1*Sum\_of\_taps(P)$$

$$Sum\_of\_taps(IR_2)=M_2*Sum\_of\_taps(P)$$

From this, it can be determined that:

$$M_1/M_2=Sum\_of\_taps(IR_1)/Sum\_of\_taps(IR_2)=k$$

Further, EXT can be calculated from the following equation:

$$EXT=(IR_1-IR_2*k)/(k-1)$$

In any event, if $IR_1$, $IR_2$, $M_1$, and $M_2$ are known, then EXT can be calculated. Moreover, the control logic 35 is configured to calculate the crosstalk cancellation value (EXT) based on the equations indicated above, as well as the two APD measurements at different gains, and to store such value in memory 37 for use in canceling electrical crosstalk after the calibration process. For example, upon receiving a new measurement of the APD 27 from the A/D converter 32, the crosstalk canceler 34 is configure to subtract EXT from the new measurement in order to cancel crosstalk thereby providing an updated measurement value that is substantially free of electrical crosstalk. Such updated measurement value is received by the OTDR 17, which uses the updated measurement value as a sample of the APD 27 for detecting anomalies along the fiber 15 according to known techniques.

If desired, the control logic 35 may repeat the process described above to calculate multiple crosstalk cancellation values and then mathematically combine (e.g., average) such crosstalk cancellation values into a single value to be used for crosstalk cancellation. However, calculating and combining multiple crosstalk cancellation values is unnecessary.

An exemplary use and operation of the system 12 depicted by FIG. 5 will be described in more detail below with particular reference to FIG. 6.

Figure 6:
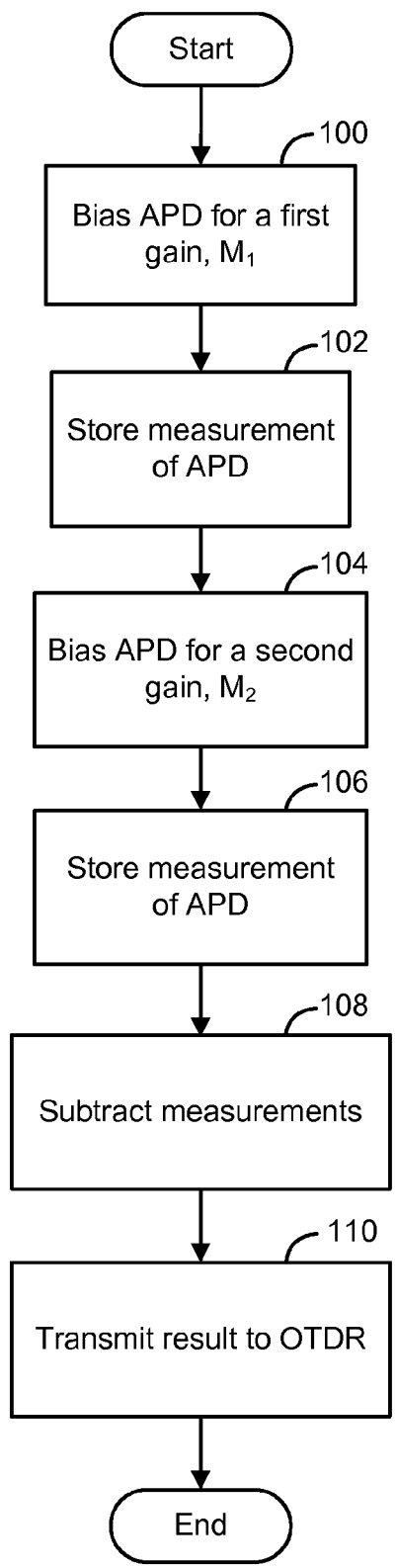
FIG. 6 is a flowchart illustrating an exemplary method for canceling electrical crosstalk to provide an optical measurement that is substantially free of electrical crosstalk.

During a calibration process for the optical transmission system 12, the control logic 35 transmits a control signal to the APD 27 to set the APD bias voltage such that the gain of the APD 27 is at a first value, $M_1$, as shown by block 100 of FIG. 6. Optical returns are reflected back across the optical fiber 15 to the OSA 22 and are received by the APD 27. The APD 27 converts the optical returns into analog electrical signals, which are corrupted by electrical crosstalk from at least the driver 30 and laser diode 25. The A/D converter 32 converts the analog electrical signal into a digital signal defining a measurement ($IR_1$) of an optical return, and the control logic 35 of the crosstalk canceller 34 stores $IR_1$ in memory 37, as shown by block 102 of FIG. 6.

After storing $IR_1$, the control logic 35 adjusts the APD bias voltage such that the gain of the APD 27 is at a second value, $M_2$, which is different than $M_1$, as shown by block 104 of FIG. 6. After the gain of the APD 27 is adjusted to $M_2$, the A/D converter 32 provides another measurement ($IR_2$), and the control logic 35 of the crosstalk canceller 34 stores $IR_2$ in memory 37, as shown by block 106 of FIG. 6.

After determining and storing $IR_1$ and $IR_2$, the control logic 35 subtracts the two stored measurements, as shown by block 108 of FIG. 6, thereby providing an updated measurement that is free of the effects of electrical crosstalk. The crosstalk canceler 34 then transmits the result of the subtraction operation to the OTDR 17, as shown by block 110 of FIG. 6, and the OTDR 17 uses such result as a measurement of the APD 27 for detecting anomalies along the fiber 15.

Now, therefore, the following is claimed:

1. An optical subassembly, comprising:
a laser diode for transmitting an optical signal through an optical fiber coupled to the optical subassembly;
driver circuitry coupled to the laser diode;
an avalanche photodiode (APD) for receiving and measuring optical signals from the optical fiber; and
a crosstalk canceller configured to estimate an amount of electrical crosstalk induced by the driver circuitry and affecting a first measurement from the APD, the crosstalk canceller further configured to store data indicative of the estimate in memory and to cancel, based on the stored data, electrical crosstalk affecting a second measurement from the APD of one of the optical signals.

2. The optical subassembly of claim 1, wherein the optical subassembly is coupled to an optical time domain reflectometer (OTDR), wherein the crosstalk canceller is configured to transmit the one measurement to the OTDR.

3. The optical subassembly of claim 1, further comprising an analog-to-digital (ND) converter coupled between the crosstalk canceller and the APD.

4. The optical subassembly of claim 1, wherein the crosstalk canceller is configured to control a bias voltage of the APD such that the APD applies a gain for the first measurement that is different relative to a gain applied by the APD for a third measurement of the optical signals, and wherein the crosstalk canceller is configured to calculate the amount of electrical crosstalk based on the first and third measurements.

5. The optical subassembly of claim 1, further comprising an optical switch coupled between the laser diode and the optical fiber, wherein the crosstalk canceller is configured to control the optical switch such that the optical switch prevents optical signals from the laser diode from propagating through the optical fiber during the first measurement.

6. A method for eliminating electrical crosstalk from optical measurements, comprising:
driving a laser diode via driver circuitry such that the laser diode transmits an optical signal;
receiving, via an avalanche photodiode (APD), optical returns from an optical fiber coupled to the laser diode;
providing a first measurement from the APD;
measuring one of the optical signals via the APD thereby providing a second measurement from the APD;
estimating an amount of electrical crosstalk affecting the first measurement;
storing, in memory, data indicative of the estimated amount of electrical crosstalk; and
canceling electrical crosstalk from the second measurement based on the stored data.

7. The method of claim 6, further comprising disconnecting the optical fiber from the laser diode prior to the transmitting step.

8. The method of claim 6, further comprising measuring one of the received optical signals via the APD thereby providing a third measurement from the APD, wherein a gain applied by the APD for the first measurement is different relative to a gain applied by the APD for the third measurement, and wherein the estimating comprises calculating the amount of electrical crosstalk based on the first and third measurements.

9. The method of claim 6, further comprising transmitting the second measurement to an optical time domain reflectometer after the canceling.

10. The method of claim 6, further comprising controlling an optical switch coupled between the laser diode and the optical fiber such that the switch prevents optical signals from the laser diode from propagating through the optical fiber during the first measurement.

11. The optical subassembly of claim 1, further comprising a user interface, wherein the crosstalk canceller is configured to initiate a calibration process to obtain the estimate of an amount of electrical crosstalk in response to receiving an input from the user interface.

12. The optical subassembly of claim 1, wherein the first measurement from the APD during the calibration process corresponds to the estimate of an amount of electrical crosstalk.

13. The optical subassembly of claim 1, further comprising receive circuitry configured to provide electrical signals indicative of the first and second measurements, the receive circuitry including the APD, wherein the electrical crosstalk couples from the driver circuitry to the receive circuitry.

14. The optical subassembly of claim 13, wherein the electrical crosstalk couples from the driver circuitry to the receive circuitry without propagating along the optical fiber.

15. The method of claim 6, further comprising initiating a calibration process to obtain the estimate of the amount of electrical crosstalk in response to receiving an input from a user interface, the calibration process including the driving, the receiving, the providing, the estimating, and the storing.

16. The method of claim 6, wherein the estimating includes attributing the first measurement from the APD to the estimate of the amount of electrical crosstalk.

17. The method of claim 6, further comprising providing electrical signals, via receive circuitry, indicative of the first and second measurements, wherein the receive circuitry includes the APD, and wherein the electrical crosstalk couples from the driver circuitry to the receive circuitry.

18. The method of claim 17, wherein the electrical crosstalk couples from the driver circuitry to the receive circuitry without propagating along the optical fiber.

* * * * *